Figures 1, 2, 3:
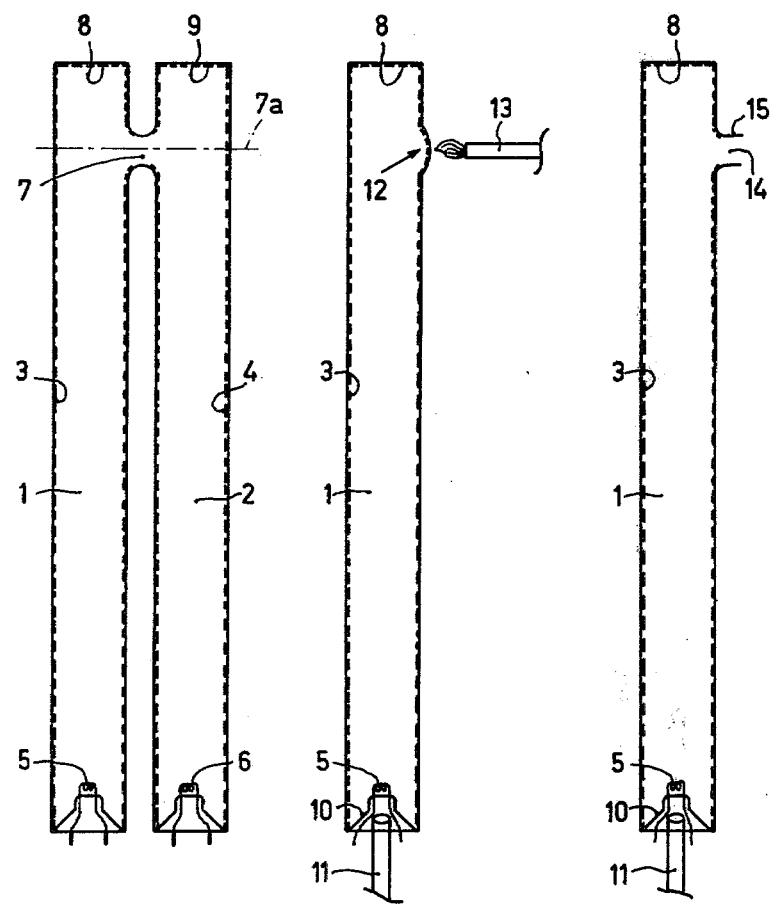

United States Patent [19]

van der Wolf et al.

[11] 4,324,447
[45] Apr. 13, 1982

[54] METHOD OF PRODUCING A LOW-PRESSURE MERCURY VAPOR DISCHARGE LAMP

[75] Inventors: Rein W. van der Wolf; Cornelis J. van den Broek, both of Roosendaal, Netherlands

[73] Assignee: U.S. Philips Corporation, New York, N.Y.

[21] Appl. No.: 130,284

[22] Filed: Mar. 14, 1980

[30] Foreign Application Priority Data

Apr. 3, 1979 [NL] Netherlands ............... 7902571

[51] Int. Cl.³ ............................... H01J 9/26
[52] U.S. Cl. ................... 316/17; 29/25.13; 313/220; 316/19
[58] Field of Search ............... 316/17, 19, 24; 29/25.13; 313/220; 65/55, 110

[56] References Cited

U.S. PATENT DOCUMENTS 3,117,248  1/1964  Lake ................... 313/220

FOREIGN PATENT DOCUMENTS 858105  12/1952  Fed. Rep. of Germany .
2116803  7/1972  France ................... 313/220

Primary Examiner—John McQuade
Attorney, Agent, or Firm—Robert S. Smith

[57] ABSTRACT

Method of producing a low-pressure mercury vapor discharge lamp consisting of two or more parallel discharge tubes which are interconnected by means of a cross-connection. In this method two adjacent discharge tubes are interconnected after the inside of the wall of the tubes has been coated with a luminescent layer and after they have been sealed at one end. The connection between the two tubes is then effected by making an aperture with an outwardly extending collar in the wall of each of the tubes, placing the apertures opposite to one another and fusing the collars together.

4 Claims, 3 Drawing Figures

METHOD OF PRODUCING A LOW-PRESSURE MERCURY VAPOR DISCHARGE LAMP

The invention relates to a method of producing a low-pressure mercury vapor discharge lamp comprising two or more substantially parallel co-extending glass discharge tubes, the discharge spaces of two adjacent discharge tubes being interconnected by a coupling tube extending transverse to the axes of the discharge tubes, during operation of the lamp the discharge passing predominantly through the discharge tubes, in which method the discharge tubes are first coated on the inside with a luminescent layer and closed at one end. Such a method is disclosed in German Patent Specification No. 858,105.

This German Patent Specification proposes to replace the known elongate tubular low-pressure mercury vapor discharge lamp having a length of 120 cm and an inside diameter of 30–40 mm for a number of specific uses by two parallel adjacent discharge tubes, each approximately 60 cm long and having the same inside diameter, the discharge spaces of which are interconnected by means of a coupling tube located near the said one end. The electrodes are then provided at the other ends of the said discharge tubes, so that a U-shaped discharge path is obtained.

The above-mentioned Patent Specification describes that the above-mentioned lamps are produced by providing an aperture in the glass wall of the discharge tube prior to deposition of the luminescent layer, the connecting coupling tube being sealed thereto after the application of the luminescent layer. Such a method has the drawback that during coating of the discharge tube wall with luminescent material, which is often done by means of a suspension, liquid material can easily flow out through the said aperture so that it is difficult to realize a uniform coating on said wall. There is also the risk that fusion of the coupling tube to the discharge tube is made more difficult by enclosure of luminescent material in the glass seal, which might cause stresses in the glass and the chance of fracture is considerable. Especially during the production of small-size lamps the use of loose components such as the coupling tube is time-consuming, whereas special tools are required to secure those components to the discharge tubes.

It is an object of the invention to provide a method of producing a low-pressure mercury vapor discharge lamp having a shape as described in the above-mentioned German Patent Specification, the connection between the discharge tube being effected in a rapid and reliable manner.

According to the invention this object is accomplished with a method as described in the opening paragraph which is characterized in that, after application of the luminescent layer to the inside of the discharge tube wall, the connection with the adjacent discharge tubes is effected in a gas-tight manner by making an aperture having an outwardly facing collar in the wall of each of the tubes, by thereafter placing the apertures opposite to one another and by thereafter fusing the collars together to form a said coupling tube.

With a method according to the invention the discharge spaces limited by the wall of the discharge tubes are interconnected without the necessity for loose components such as a coupling tube. The risk of leakage or fracture is small in lamps produced by the method according to the invention. In addition, the method according to the invention offers the possibility to provide lamps whose dimensions can be reduced so that they may serve as an alternative for incandescent lamps for general illumination, the discharge tubes being placed relatively very closely next to one another.

In a method according to the invention the aperture in the discharge tube is provided in the region of the cross connection, after the inner wall of the discharge tube has been provided with a luminescent layer. It was surprisingly found that during fusion of the collars no particles of the luminescent material are present in the glass seal. Also, the thickness of the glass wall in the region of the collar is amply sufficient to prevent stresses from being produced in the glass. Therefore the risk of fracture or leakage in the region of the cross connection is very small.

The collared aperture in the wall of the discharge tube may be formed by locally softening the wall by means of heating and blowing the softened portion outwardly from the inside of the discharge tube by an excess gas pressure within the tube. This is, for example, effected by passing an air-current through the tube after it has already been closed at one end. In this way a reliable cross connection can be realized in a very simple manner.

The thickness of the glass wall of the discharge tube does, of course influence the quality of the cross connection. Experiments showed that an adequate seal was obtained with the wall thickness approximately 1.35 mm commonly used in discharge tubes. If the glass wall is too thin in the region of the aperture to be formed, an aperture having a collar suitable for fusion with an adjacent collar can be realized by means of a method according to the invention by increasing the thickness of the thin wall in the region of the collar to be formed, by means of an additional layer of glass, consisting, for example of an easily softenable lead glass.

A method according to the invention is not limited to the inter connection of only two parallel discharge tubes. It is alternatively possible to interconnect three or more tubes. This results in, for example, a lamp having four discharge tubes located in one plane or in a lamp having four parallel discharge tubes in a square formation.

Embodiments of the invention will now be explained by way of example with reference to the accompanying drawing, in which FIG. 1 shows schematically an example of an embodiment of a low-pressure mercury vapor discharge lamp produced with a method according to the invention.

FIG. 2 and FIG. 3 are schematic drawings of production stages in a method according to the invention.

The lamp shown in FIG. 1 comprises two parallel co-extensive discharge tubes 1 and 2 which are coated on the inside with a luminescent layer 3 and 4, respectively. Electrodes 5 and 6 are located next to one another at the ends of the tubes. The discharge spaces of both tubes are interconnected near their ends remote from the electrodes by means of a cross-connection 7, which extends substantially transversely to the longitudinal axis of the lamp. This cross-connection is produced by means of a method which will be further explained with reference to the FIGS. 2 and 3. Each tube is sealed at the end remote from the electrodes to form a flat plane (8 and 9, respectively). The inner surfaces of these flat ends are also coated with a luminescent layer.

FIGS. 2 and 3 show two stages in the method of producing a lamp shown in FIG. 1. The production of such a lamp starts from a glass tube which is, open at both ends. Thereafter, the inside of the tube wall is coated with a luminescent material suspension, whereafter the luminescent layer 3 is adhered to the wall by means of a sintering process. The end (8) of the tube (1) is then sealed. (This procedure is also performed for the adjacent discharge tube 2). A sealed tube end (8 or 9) is formed in that a coated glass tube is softened near the end and slightly elongated, whereafter a gas-tight seal is produced by melting.

The other end of each tube is provided with the so-called stem 10 to which the electrode 5 and the exhaust tube 11 are connected. An aperture with a raised collar is thereafter formed in the side-wall of each tube. In the region 12 where the aperture is to be formed the wall is slightly softened by means of a burner 13.

By means of a gas current which is introduced through the exhaust tube 11, a slight excess pressure is created which causes the wall to open in the region 12 and a raised edge, or collar, is formed. FIG. 3 shows this situation, in which the aperture is denoted by reference numeral 14 and the collar by 15.

An aperture is also formed by means of this method in the discharge tube 2 and a lamp, shown in FIG. 1 is formed by fusing the two collars together. During this procedure no particles of the luminescent material are enclosed in the seal. Consequently, the risk of stresses in the glass wall and of fracture due to enclosed luminescent material is small.

In a method according to the invention it is not necessary to coat the tubes 1 and 2 first with a luminescent layer and to seal them thereafter at the end 8 or 9. It is alternatively possible to seal the tubes first in a gas-tight manner and to coat them thereafter.

In a practical embodiment of a low-pressure mercury vapor discharge lamp as shown in FIG. 1, the discharge tubes 1 and 2 are approximately 15 cm long and their inside diameters are approximately 1 cm. The inside diameter of the cross-connection 7 is approximately 0.6 cm. The axis of this cross-connection is at a distance of approx. 1.5 cm from the ends 8 and 9. The distance between the longitudinal axes of the discharge tubes is approximately 1.5 cm. The inside of the wall of the tubes 1 and 2 have been coated with a luminescent layer which converts the U.V.-radiation generated in the discharge into visible light. A suitable luminescent material is a mixture of two phosphors, namely green-luminescing terbium-activated cerium magnesium aluminate and red-luminescing tri-valent europium-activated yttrium oxide. The luminous flux of this lamp when filled with argon at a pressure of 400 Pa was approximately 700 Lumen at an applied power to the lamp of 10 W. (Operating voltage 60 V, current 200 mA).

What is claimed is:

1. A method of producing a low-pressure mercury vapor discharge lamp comprising two or more substantially parallel co-extending glass discharge tubes, the discharge spaces of two adjacent discharge tubes being interconnected by a cross coupling extending substantially transversely to the wall of those discharge tubes, during operation of the lamp the discharge passing through the greater part of the discharge tubes, in which method the inner wall of each discharge tube is first coated with a luminescent layer and sealed at one end, characterized in that after application of the luminescent layer to the inner wall of the discharge tube, the connection between adjacent discharge tubes is effected in a gas-tight manner by making an aperture, having an outwardly-extending collar, in the wall of each of the tubes, by thereafter placing the apertures opposite one another and by thereafter fusing the collars together to form said cross coupling.

2. A method as claimed in claim 1, characterized in that the mailing of the aperture with collar is accomplished by softening the wall of the discharge tube in that region by means of heating and by thereafter blowing the softened portion outwardly from the inside of the tube by an excess gas pressure within the tube.

3. A low-pressure mercury vapor discharge lamp comprising two or more substantially parallel co-extending glass discharge tubes, the discharge spaces of two adjacent discharge tubes being interconnected by a cross coupling extending substantially transversely to the wall of those discharge tubes, during operation of the lamp the discharge passing through the greater part of the discharge tubes, produced by a method in which the inner wall of each discharge tube is first coated with a luminescent layer and sealed at one end, characterized in that after application of the luminescent layer to the inner wall of the discharge tube, the connection between adjacent discharge tubes is effected in a gas-tight manner by making an aperture, having an outwardly-extending collar, in the wall of each of the tubes, by thereafter placing the apertures opposite one another and by thereafter fusing the collars together to form said cross coupling.

4. A low-pressure mercury vapor discharge lamp comprising two or more substantially parallel co-extending glass discharge tubes, the discharge spaces of two adjacent discharge tubes being interconnected by a cross coupling extending substantially transversely to the wall of those discharge tubes, during operation of the lamp the discharge passing through the greater part of the discharge tubes, said lamp being produced by a method in which the inner wall of each discharge tube is first coated with a luminescent layer and sealed at one end, after application of the luminescent layer to the inner wall of the discharge tube, the connection between adjacent discharge tubes being effected in a gas-tight manner by making an aperture, having an outwardly-extending collar, in the wall of each of the tubes, by thereafter placing the apertures opposite one another and by thereafter fusing the collars together to form said cross coupling, the making of the aperture with collar being accomplished by softening the wall of the discharge tube in that region by means of heating and by thereafter blowing the softened portion outwardly from the inside of the tube by applying gas pressure within the tube.

* * * * *